United States Patent
Geissler

(10) Patent No.: US 6,843,623 B2
(45) Date of Patent: Jan. 18, 2005

(54) HIGH-SPEED SPINDLE UNIT FOR MACHINE TOOLS

(75) Inventor: Alfred Geissler, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 172 days.

(21) Appl. No.: 10/364,964

(22) Filed: Feb. 11, 2003

(65) Prior Publication Data

US 2003/0152433 A1 Aug. 14, 2003

(30) Foreign Application Priority Data

Feb. 14, 2002 (DE) ................................. 202 02 260 U

(51) Int. Cl.⁷ .......................... B23C 1/00; B23Q 11/00
(52) U.S. Cl. .................. 409/231; 408/239 R; 384/624; 409/233; 409/134
(58) Field of Search ............................. 409/231–233, 409/134; 408/239 R, 238, 240, 239 A; 384/624

(56) References Cited

U.S. PATENT DOCUMENTS

| 4,063,786 A | * | 12/1977 | Rall | 384/624 |
| 4,514,123 A | * | 4/1985 | Johnstone et al. | 409/231 |
| 4,657,412 A |   | 4/1987 | McLarty et al. | |
| 4,815,903 A | * | 3/1989 | Skidmore, Sr. | 409/231 |
| 5,779,474 A | * | 7/1998 | Gonser | 433/129 |
| 6,367,977 B1 | * | 4/2002 | Kashchenevsky | 384/101 |

FOREIGN PATENT DOCUMENTS

DE     3710185     10/1988

OTHER PUBLICATIONS

W. Hörning, Konstruktion von Werkzeugmaschinenlagerungen, FAG, Wälzlagertechnik, pp. 34–45 (1986).

* cited by examiner

*Primary Examiner*—Erica Cadugan
(74) *Attorney, Agent, or Firm*—The Maxham Firm

(57) ABSTRACT

A high-speed spindle unit for milling and drilling machines. The spindle unit has a spindle housing on the front end portion of which a terminating ring detachably mounted and a rotationally driven tool spindle which is supported in at least a front roller bearing inside the spindle housing, a ring nut being attached to the front end portion of said spindle. Between the terminating ring and the ring nut a pre-dimensioned ring-shaped gap extending in the radial direction is formed, the gap width of the gap being decreasable to zero with increasing axial load acting on the spindle.

11 Claims, 2 Drawing Sheets

HIGH-SPEED SPINDLE UNIT FOR MACHINE TOOLS

BACKGROUND OF THE INVENTION

1. Field of the Invention

The present invention relates to a high-speed spindle unit for machine tools for machining workpieces.

2. Discussion of Related Art

Modern high-speed spindles are driven with speeds up to several ten thousand rpm, which is, of course, only possible with fully functional and highly precise bearings. The precision bearings used for the spindle of such high-speed spindle units are, however, highly susceptible to pressure or shock loads acting on the tool and spindle body. These loads are, in particular, transmitted to the housing via the front roller bearing. This holds true for impact and shock loads acting on the clamped tool or on the tool spindle, or both. These loads are caused by a collision with a machine part or the workpiece during shifting movements of the workpiece or the spindle unit, or both, while no machining operation is carried out.

Further, extremely high loads may occur during a machining operation, for example, in case of an excessive feeding movement, an erroneously selected cutting tool, or a change of the material structure of the workpiece. In both cases of stress the impact-like shock loads or peak loads may damage the high-precision roller bearings, and thus, affect the true running properties, which are particularly critical. This may lead to a possibly permanent damage of the components involved, which will inevitably require an exchange of the spindle unit.

SUMMARY OF THE INVENTION

It is an object of the invention to provide a high-speed spindle unit in which a deterioration of the front bearings of the spindle, due to mechanical peak loads as well as damage caused by overload, can largely be avoided.

According to the invention, this object is addressed by dimensioning a gap between the two faces so that the two faces are in contact with each other when an axial load acting on the spindle has reached a certain value. The load is directly transmitted from the spindle component to the housing component under avoidance of the roller bearing parts.

If the spindle receives a shock-like axial load, for example, because of a collision with the workpiece while the tool is inactive or idle, the impact forces, up to a certain tolerable magnitude, are transmitted to the housing via the clamped tool holder, the spindle body and the inner race of the front roller bearing while the components are deformed to a permissible degree without any damage being caused. If the shock loads exceed the predetermined magnitude, the ring nut attached to the rear spindle body comes into pressure contact with the associated face of the terminating ring of the housing after the gap has closed so that the peak pressures are directly introduced into the housing and the bearing components are withdrawn from the influence of the peak loads.

If axial loads which are within predetermined limits, act on the tool during a machining operation, they are transmitted from the spindle body to the housing via the roller bearings in the manner described above. The width of the gap according to the invention decreases depending on the magnitude of the load. Only after the gap has fully closed under a heavy load is there a pressure contact between the rotating rear face of the ring nut and the front face section of the stationary terminating ring of the housing, which results in a strong heating of the paired frictional surfaces.

The described function of the gap according to the invention gives rise to a relief of the roller bearing parts in case of abnormally large loads acting on the spindle. Since the individual surfaces of the paired friction surfaces will regularly tarnish, or change their color, it can be determined by visual inspection during maintenance work whether the spindle was driven with excessive loads during operation which exceeded the manufacturer's specifications.

For obtaining the intended effects, the dimensions of the gap according to the invention are of substantial importance. The gap width is determined for different kinds of spindles based on different constructional and operational parameters of the respective spindle unit. So far, gap widths in the range of 50 $\mu$m to 100 $\mu$m have been found to be suitable.

The effects described above apply analogously for loads acting in a direction transverse or inclined with respect to the spindle axis. For compensating such loads a circumferential gap accurately dimensioned within predetermined limits is provided between the distance ring and the terminating ring of the housing.

To cope with the detrimental effects of the occurrence of friction welding, an advantageous further development of the invention is that the spindle component and the housing component consist of a friction welding resistant material, at least at the contact areas of their friction surfaces. In this way the occurrence of a permanent connection of the components caused by friction welding can be prevented. For obtaining that effect one or both of the friction surfaces may also be coated with a friction welding resistant material.

BRIEF DESCRIPTION OF THE DRAWING

Further particularities and advantages of the invention will become clear from the following description of preferred embodiments with reference to the drawing, in which.

DETAILED DESCRIPTION OF THE PREFERRED EMBODIMENTS

Figure 2:
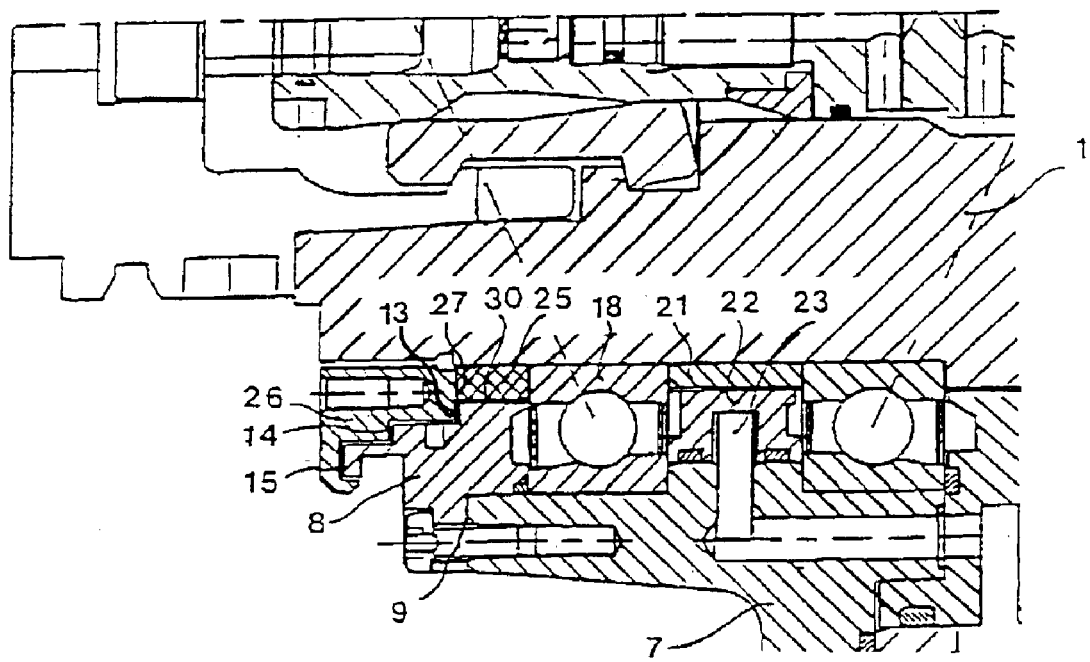
FIG. 2 is an enlarged view of details of a portion of FIG. 1.

The high-speed spindle unit shown comprises a spindle 1 driven on its rear side by a drive unit (not shown), the front end portion of the spindle being supported in two roller bearings 2 and 3 arranged in a row within a multiple-component housing 4. Housing 4 comprises outer spindle housing 5 in which housing portion 6 and front bearing housing 7 are accommodated. Terminating ring 8 of the housing, having a profiled cross section, is fixed to the front face of bearing housing 7 by means of screws. The terminating ring of the housing is provided with central ring groove 10 on its radial rear face, which faces front roller bearing 2. The radially outer portion 11 of the ring groove is supported by stationary outer bearing race 12 of roller bearing 2. As can be seen in FIG. 2, the front portion of terminating ring 8 of the housing is formed with stepped radial front surfaces 13, 14, and 15.

In a central bore of spindle 1, collet chuck 16 is provided for clamping tool holder 17 in the front recess of the spindle, the collet chuck being of a conventional type so that its further description will be omitted. The inner bearing shells or inner races 18 and 19 of roller bearings 1 and 2 have an approximately rectangular cross section and are fixedly attached to the front portion of spindle 1. The spindle has step 20, against which inner race 19 of rear roller bearing 3 is supported. Between inner races 18 and 19 of the roller bearings is clearance-free spacer ring 21 fixedly attached to spindle 1. The spacer ring is surrounded by cooling ring 22 which has a profiled cross section. The cooling ring is provided with central ring chamber 23 and a respective circumferential ring groove in both of its faces. Cooling channel 24 extending in an angled manner in housing portions 7, 6 and 5 terminates in the ring chamber. As can be seen particularly in FIG. 2, the radially outer portions of the faces of the cooling ring are in contact with the two outer bearing races of roller bearings 2 and 3.

On the front face of inner race 18 of front roller bearing 2 is distance ring 25, which is fixedly attached to spindle 1. The rear face of this distance ring is in contact with inner race 18.

Threaded bush 26 is formed with a plurality of steps in its outer circumference which correspond to step surfaces 13, 14, and 15 of terminating ring 8 of the housing as shown. Bush 26 is fixedly screwed to the leading end portion of spindle 1. A radially inner portion of radial rear face 27 of threaded bush 26 is supported by the front face of distance ring 25. According to the invention, a continuous ring-shaped gap indicated by reference numeral 29 in FIG. 1, the gap has an accurately dimensioned width and is provided between the radially outer section of face 27 and radial surface 13 of terminating ring 8 of the housing in the embodiment according to FIGS. 1 and 2. The function of the gap will be described in more detail below.

Another circumferential gap 30 with precisely set dimensions is formed between the mantle surface of distance ring 25 and the opposed inner circumferential surface of terminating ring 8 of the housing. In addition to gaps 29 and 30 having accurately dimensioned gap widths, another wider continuous gap is provided between the rotating spindle components and the stationary housing components to enable a rotation of the spindle body inside the housing. The width of that continuous gap, however, is set so that even in case of extreme peak loads the rotating components associated with the spindle cannot contact the stationary components associated with the housing.

Gaps 29 and 30 provided according to the invention are to protect roller bearings 2 and 3 against an overload caused by peak loads acting on the clamped tool or the spindle body. If the tool is extended in the direction of the spindle axis by a feeding movement while the spindle is standing still and the tool hits a stationary element, for example, the workpiece, the resulting shock is transmitted in the axial direction to the spindle through tool holder 17. In prior art machines the impact forces caused by the shock were introduced into the dimensionally stable housing portions via the roller bearings alone, which resulted in the damage mentioned above, particularly of the front roller bearing in cases of higher loads. The provision of accurately dimensioned ring-shaped gap 29 extending in the radial direction has the effect that normal axial shock loads acting on the spindle are introduced into housing part 7 via threaded bush or ring nut 26, distance ring 25 and front roller bearing 2, as long as the shock loads do not exceed a predetermined value. With an increase of such shock loads the width of gap 29 will be reduced. If the shock loads have reached a certain magnitude gap 29 will be closed so that the radially outer portion of rear face 27 of threaded bush 26 will be in contact with opposed surface area 13 of terminating ring 8 of the housing. Therefore, the shock loads acting on spindle 1 are directly introduced into terminating ring 8 via threaded bush 26 and paired ring-shaped surfaces 13 and 27. Note that terminating ring 8 of the housing is rigidly connected to bearing housing 7 of housing 4. This means that the axial peak forces will no longer act on inner bearing shell 18 via distance ring 25 so that front roller bearing 2 is protected against extreme stresses.

The width of ring-shaped gap 29 according of the invention is selected on the basis of different constructional and operational parameters so that the loads occurring are introduced into housing 4 via front roller bearing 2 in the conventional way, up to a harmless value, while the width of gap 29 decreases depending on the magnitude of the axial load. Above the load critical for roller bearing 2, gap 29 will already be closed so that the axial stress forces are directly introduced into terminating ring 8 from this moment on. It is obvious that the widths of gap 29 and circumferential gap 30 are each selected depending on the specific parameters of the respective spindle type.

Similar effects and results will occur when the idle spindle collides with a machine part, for example, a workpiece, due to a lateral relative movement, which will result in preferably radial or transverse loads acting on the spindle which were also introduced into the housing only via the roller bearings in the spindle units conventionally used. For the protection of mainly front roller bearing 2, circumferential gap 30 according to the invention is provided between distance ring 25 and the opposed surface of terminating ring 8, the gap width of gap 30 being set within a range of about 50 to about 120 $\mu$m, depending on the respective constructional and operational parameters of the spindle type concerned.

If axial or transverse peak loads which exceed the thresholds mentioned above and leading to a closure of the one or the other gap 29 and 30 occur while the spindle unit is rotating at a high speed during a machining operation, friction welding can occur at the surfaces which are then in contact with each other. The intensity of such friction welding must be limited to prevent the spindle from jamming. This case, however, rarely occurs in practice, that is, only if the maximum loads determined by the manufacturer are exceeded due to misdemeanour during operation. To reduce the detrimental effects of such friction welding under extremely high loads, distance ring 25, ring nut 26, and terminating ring 8 consist of materials selected in view of high heat resistance or good sliding properties at high temperatures, or both, at least at the wall portions defining gaps 29 and 30. Such materials comprise, for example, special ceramic materials, possibly containing reinforcing fibres, hard steel, brass, bronze, or any of the foregoing alone or in combination. The respective surfaces of those components may also be coated with such materials in an appropriate thickness to cope with extremely high temperatures in the area of the pairing friction surfaces or to prevent welding effects from occurring, or both.

Figure 1:
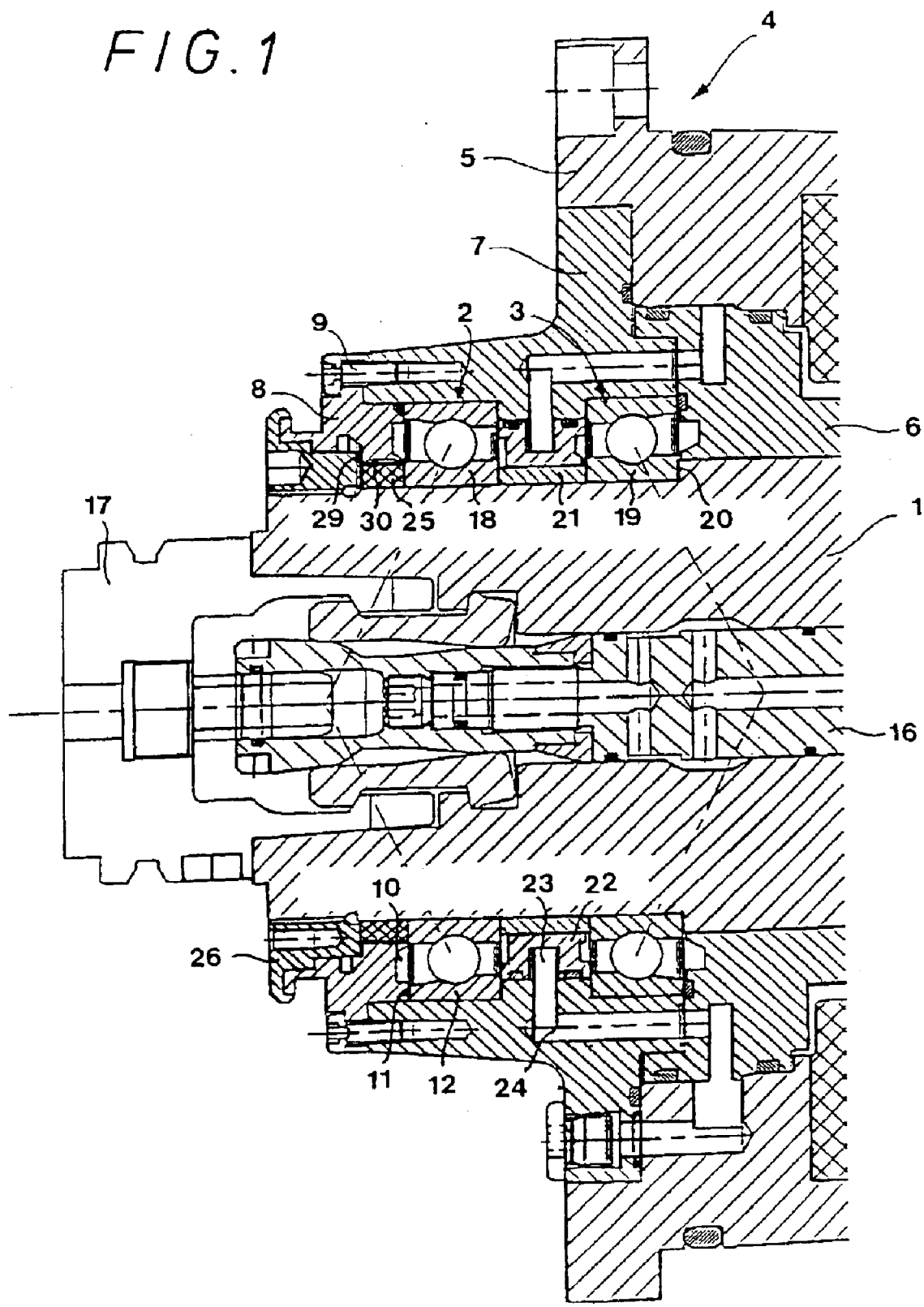
FIG. 1 is an axial cross sectional view of the front end portion of a high-speed spindle unit according to the invention.
Figure 3:
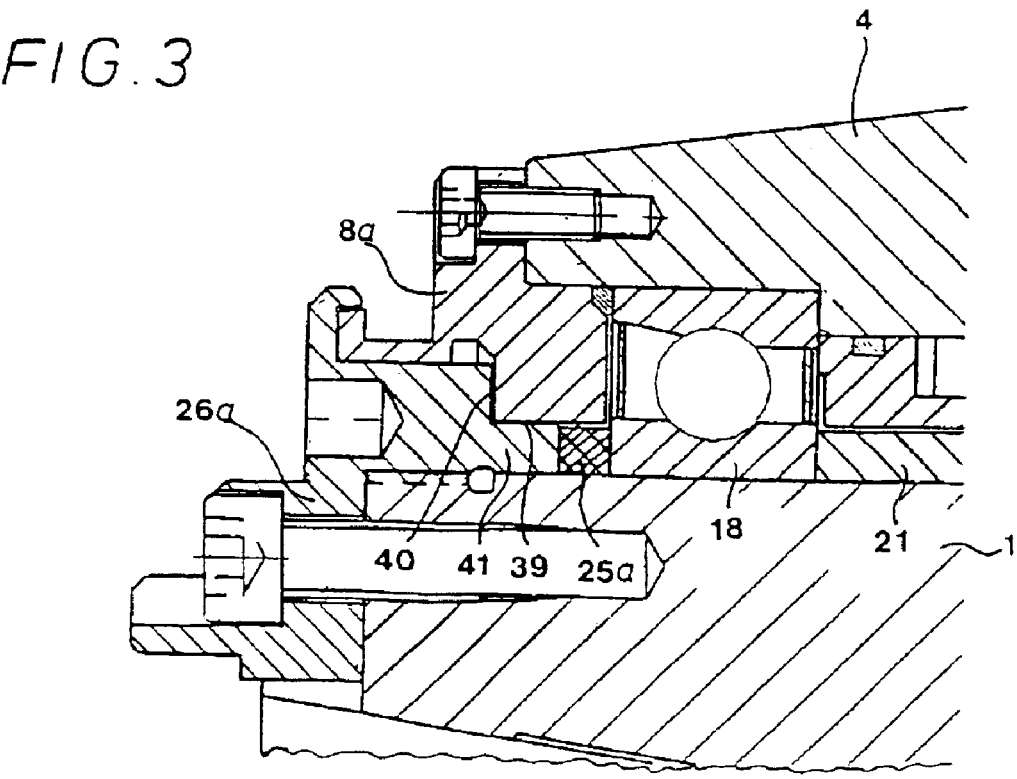
FIG. 3 is an enlarged portion of the upper spindle bearing according to another embodiment of the invention.

The variant shown in an enlarged axial cross sectional view in FIG. 3 corresponds to the embodiment according to FIGS. 1 and 2 in its constructional features so that corresponding components are indicated by the same reference numbers. This variant differs from the embodiment according to FIGS. 1 and 2 in that radial ring-shaped gap 40 dimensioned according to the invention is formed between a rear ring-shaped collar of ring nut 26a and a ring-shaped surface on the front side of terminating ring 8a. The width of ring-shaped gap 40 is in a range from about 10 μm to about 80 μm, similar to the embodiment according to FIGS. 1 and 2, and will be determined for the respective spindle type depending on the specific conditions and parameters. In the variant according to FIG. 3, ring nut 26a attached to the front end portion of spindle 1 comprises radially inner shoulder 41, the end surface of which is in contact with the face of distance ring 25a. The distance ring is narrower here than in the earlier embodiment and is fixed on spindle 1 by appropriate means such as by shrink fitting. Between the outer circumferential surface of distance ring 25a and the opposed surface of terminating ring 8a a relatively wide ring-shaped gap is provided. The width of this gap excludes any mutual contact of components 25a and 8a, even under extremely high peak loads. Precisely dimensioned circumferential gap 39, functionally corresponding to circumferential gap 30 of the embodiment according to FIGS. 1 and 2, is located between the outer circumferential surface of inner shoulder 41 of ring nut 26a and an inner circumferential surface of terminating ring 8a in the variant according to FIG. 3. The variant described above and shown in FIG. 3 has the advantage of a facilitated maintenance and inspection since distance ring 25a is withdrawn from the influences of the peak loads and can remain on spindle 1. Two ring-shaped or circumferential gaps 39 and 43, relevant in view of the peak loads, are located between ring nut 26a and terminating ring 8a. Both components can be removed and replaced if required in a simple manner by detaching the respective screw connection. In this way several hours of mounting time can be saved.

The invention is not limited to the embodiments shown but includes spindle units in which other ring-shaped gaps or circumferential gaps are dimensioned between the rotating spindle parts and the stationary housing parts in the manner explained above to protect load sensitive components.

What is claimed is:

1. A high-speed spindle unit for milling and drilling machines, said unit comprising:
   a spindle housing having a front end portion proximal to a tool mounting location;
   a terminating ring detachably mounted on said front end portion;
   a ring nut fixed on said front end portion;
   a front roller bearing in said housing; and
   a rotationally driven tool spindle rotatable about an axis and supported in the spindle housing by at least said front roller bearing;
   the terminating ring and the ring nut being mutually configured and dimensioned to from a pre-dimensioned ring-shaped gap between them, the gap extending in the radial direction, the structure of said spindle unit being configured to permit the axial width of said gap to decrease with an increasing front-to-back axial load acting on the spindle.

2. The spindle unit according to claim 1, and further comprising a distance ring fixed on the spindle in front of the roller bearing, wherein an accurately dimensioned circumferential gap is formed between the distance ring and the terminating ring of the housing, the radial gap width of said circumferential gap being decreasable with a radial load acting on the spindle increasing.

3. The spindle unit according to claim 2, wherein at least the surfaces of the components defining the ring-shaped gap and the circumferential gap consist of a friction welding resistant material at least at the portions forming the respective ring-shaped and circumferential gaps.

4. The spindle unit according to claim 2, wherein a pre-dimensioned second circumferential gap is formed between the terminating ring of the housing and the ring nut detachably mounted on the spindle, the radial width of said second circumferential gap being decreasable with an increasing radial load acting on spindle.

5. The spindle unit according to claim 4, wherein at least the surfaces of the components defining the ring-shaped gap and the circumferential gaps consist of a friction welding resistant material at least at the portions forming the respective ring-shaped and circumferential gaps.

6. The spindle unit according to claim 4, wherein the axial width of the ring-shaped gap and the radial widths of the circumferential gaps are selected within a range from about 50 μm to about 120 μm depending on constructional and operational parameters of the respective spindle type.

7. The spindle unit according to claim 2, wherein the axial and radial widths of the ring-shaped gap and the circumferential gap, respectively, are selected within a range from about 50 μm to about 120 μm depending on constructional and operational parameters of the respective spindle type.

8. The spindle unit according to claim 1, wherein a pre-dimensioned circumferential gap is formed between the terminating ring of the housing and the ring nut detachably mounted on the spindle, the radial width of said circumferential gap being decreased with an increasing radial load acting on the spindle.

9. The spindle unit according to claim 8, wherein at least the surface of the components defining the ring-shaped gap and the circumferential gap consist of a friction welding resistant material at least at the portions forming the respective ring-shaped and circumferential gaps.

10. The spindle unit according to claim 1, wherein the axial width of the ring-shaped gap is selected within a range from about 50 μm to about 120 μm depending on the constructional and operational parameters of the respective type.

11. The spindle unit according to claim 1, wherein at least the surfaces of the components defining the ring-shaped gap consist of a friction welding resistant material at least at the portions forming the ring-shaped gap.

* * * * *